United States Patent Office 2,842,604
Patented July 8, 1958

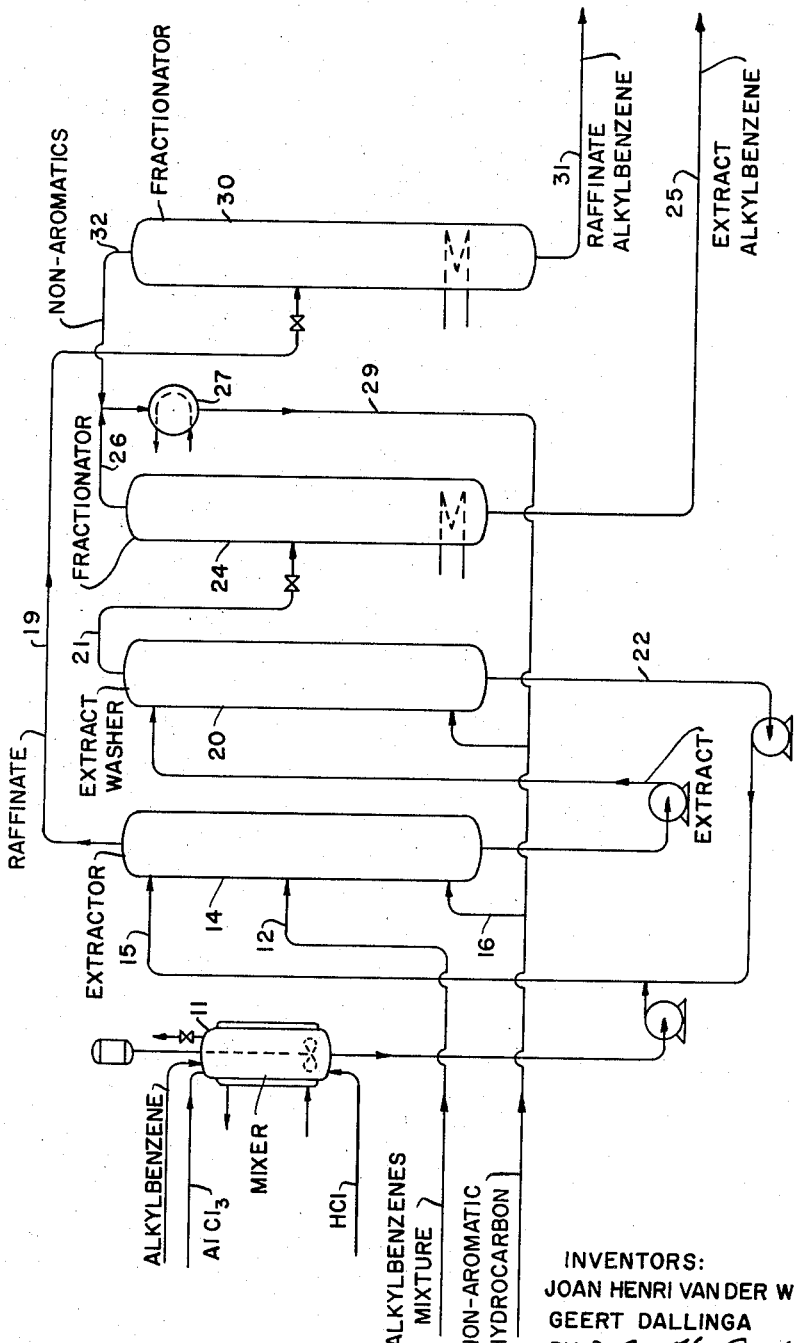

2,842,604

SEPARATION OF MIXTURES OF ALKYL-SUBSTITUTED AROMATIC HYDROCARBONS WITH ALUMINUM HALIDES

Joan Henri van der Waals and Geert Dallinga, Amsterdam, Netherlands, assignors to Shell Development Company, Emeryville, Calif., a corporation of Delaware Application February 16, 1953, Serial No. 337,223

Claims priority, application Netherlands April 9, 1952

13 Claims. (Cl. 260—674)

This invention relates to the separation of mixtures of alkyl-substituted aromatic hydrocarbons, particularly to the separation of mixtures of alkyl benzenes having relatively similar boiling temperatures and which are difficult to separate by simple fractional distillation. More specifically, it relates to the separation of mixtures of isomeric alkyl benzenes having the empirical formula $C_8H_{10}$.

In recent years, the production of aromatic hydrocarbons from non-aromatic hydrocarbons in petroleum fractions by certain petroleum refining and conversion processes, including dehydrogenation of alkylated cyclohexanes, has resulted in the production of large quantities of difficultly separable mixtures of similarly volatile isomeric alkylated aromatic hydrocarbons. A mixture of ortho-, meta- and para-xylenes and ethyl benzene and a mixture of alpha-methyl naphthalene and beta-methyl naphthalene are representative of such a mixture. Recent developments in the chemical industry, for example, the conversion of ortho-xylene to phthalic anhydride, of ethyl benzene to styrene and of para-xylene to terephthalic acid, have considerably increased the demand for the individual isomers.

Various methods have been proposed for separating the various constituents of these isomeric mixtures. It is possible to separate ortho-xylene from an isomeric aromatic $C_8$-fraction by very sharp distillation, but for the separation of the other three components, which boil at substantially the same temperature, it is necessary to employ some other process. Para-xylene can be separated from a mixture thereof with meta-xylene and ethyl benzene by crystallization; however, this method has two disadvantages: first, a low temperature (about —60° C.) is required, and secondly, only a part of the para-xylene present can be recovered because a para-xylene-meta-xylene eutectic mixture is formed at a concentration of 88% m-xylene and 12% p-xylene. It has also been proposed to separate the three constituents by solvent extraction with a mixture of HF and $BF_3$. In this method, however, the alkyl benzene is separated from the solvent by distillation, and the solvent may cause isomerization of the extracted xylene isomer at the temperatures prevailing in the distillation column. Furthermore, it is necessary to take special precautions when working with HF.

It is, therefore, a principal object of the present invention to provide an improved method for separating mixtures of alkyl-substituted aromatic hydrocarbons having relatively similar boiling temperatures. A more specific object is to provide an improved method for separating mixtures of isomeric alkyl benzenes. Still another object is to provide an improved method for separating mixtures of isomeric alkyl benzenes having the empirical formula $C_8H_{10}$, particularly mixtures of para-xylene and meta-xylene. Other objects and advantages will become apparent from the following detailed description, which will be made with reference in part to the accompanying drawing, wherein:

The sole figure of the drawing is a schematic representation of process and equipment for the practice of the invention.

In accordance with the present invention, it has now been found that mixtures of alkyl-substituted aromatic hydrocarbons, particularly alkyl benzenes, having relatively similar boiling temperatures can be separated by selective formation of soluble complexes of one or more of the alkyl aromatics with an aluminum halide, preferably in the presence of a hydrogen halide. More specifically, it has been found that mixtures of alkyl-substituted aromatic hydrocarbons can be separated by contacting the mixture with an extracting agent comprising a complex of an aluminum halide and an alkyl-substituted aromatic hydrocarbon, which complex is at least as stable as the complex formed from the aluminum halide and the alkyl-substituted aromatic hydrocarbon in the initial mixture which forms the most stable complex therewith, thereby producing an extract phase substantially enriched in the alkyl-substituted aromatic hydrocarbon of the initial mixture which forms the most stable complex with the aluminum halide.

A specific embodiment of the invention comprises separating a mixture of isomeric alkyl benzenes having from 8 to 10 carbon atoms per molecule by contacting the mixture with an extracting agent comprising a complex of an aluminum halide and an alkyl benzene, which complex is at least as stable as the complex formed from the aluminum halide and the alkyl benzene in the initial mixture which forms the most stable complex therewith, thereby producing an extract phase substantially enriched in the alkyl benzene of the initial mixture which forms the most stable complex with the aluminum halide.

A more specific embodiment of the invention comprises separating meta-xylene from a mixture of isomerc alkyl benzenes having the empirical formula $C_8H_{10}$, by contacting the mixture, at a temperature lower than about room temperature and in the presence of a substantially non-aromatic hydrocarbon having a boiling range different from that of the initial mixture, with an extracting agent comprising a complex of aluminum chloride, meta-xylene and hydrogen chloride, thereby producing an extract phase substantially enriched in meta-xylene, and recovering meta-xylene from the extract phase.

The stability of the alkylbenzene-aluminum halide complex is dependent mainly on the position and the number of alkyl substituents. Since the present process is applicable especially to the separation of alkyl aromatics which cannot be easily separated by distillation and which do not differ greatly, if at all, in molecular weight, the influence of the size of the alkyl substituents on the stability of the complex is relatively unimportant. The process of the present invention is of particular utility in the separation of mixtures of isomeric alkyl benzenes having from 8 to 10 carbon atoms per molecule, and particularly of mixtures of xylene isomers.

The various alkyl benzenes are capable of forming complexes with an aluminum halide in the following order of increasing stability: mono-alkyl benzene; para-dialkyl benzene; ortho-dialkyl benzene; meta-dialkyl benzene; 1,2,4-trialkyl benzene; 1,2,3-trialkyl benzene; 1,2,4,5-tetraalkyl benzene; 1,2,3,4-tetraalkyl benzene; 1,3,5-trialkyl benzene; 1,2,3,5-tetraalkyl benzene; penta-alkyl benzene; and hexaalkyl benzene. In the process of the present invention, the alkyl benzene in the mixture to be separated, which occupies the highest position in the foregoing sequence, is preferentially extracted. For example, when durene and ortho-diethyl benzene are present in the starting mixture, the mixture should be extracted with a complex of an aluminum halide and an alkyl benzene, which complex is at least as stable as the complex of durene and the aluminum halide. Thus, the extraction can be effected with a complex of the aluminum halide and durene or mesitylene. Durene will be preferentially extracted. If the extraction were to be effected with a complex of the aluminum halide and an alkyl benzene lower than durene in the above sequence, the extraction agent would be converted into the more stable complex.

By a suitable selection of the amount of the complex to be employed in the separation process, it is possible to extract one or more of the other alkyl benzenes which occupy a slightly lower position in the above sequence, and thus achieve a separation between alkyl benzenes which form relatively more stable complexes with the aluminum halide and alkyl benzenes which form relatively less stable complexes with the aluminum halide.

The extracting agent is generally employed in amounts of from about 50% to about 150%, by weight, based on the mixture to be separated.

The aluminum halide-alkyl benzene extracting agent can be prepared by contacting, at a relatively low temperature, for example at about 0° C., an aluminum halide, preferably aluminum chloride or bromide, with the alkyl benzene, while bubbling hydrochloric acid through the mixture. The resulting complex contains about two molecules of aluminum halide to about one molecule of the alkyl benzene. Small amounts of the aluminum halide or of the alkyl benzene may dissolve in the complex or may also be bound thereto. Therefore, the aluminum halide alkyl benzene ratio may deviate slightly from the value of 2. The molecule of the alkyl benzene present in this complex is tightly bound and cannot be recovered therefrom without destroying the aluminum halide.

The complex may also contain from 1 to 2 molecular proportions of the corresponding hydrogen halide complexly bound thereto. This will be the case if the extraction operation is carried out in the presence of liquid anhydrous hydrogen halide, such as hydrogen chloride.

Although the mechanism of extraction in the present process is not yet fully understood, it is believed that the aluminum halide-alkyl benzene complex extraction agent is capable of taking on from 1 to 5 additional molecules of alkyl benzene. These additional molecules are only loosely bound and can readily be split off from the extraction agent. For example, in the specific application of the invention to the separation of a mixture of durene and ortho-diethyl benzene, a complex of aluminum chloride and durene will preferentially take on from 1 to 5 additional molecules of durene. These additional molecules of durene can be readily recovered from the aluminum chloride-durene complex extraction agent as hereinafter described.

The extraction operation can be carried out in any conventional manner in one or more stages and either continuously or batchwise. Concurrent, crosscurrent or countercurrent flow can be employed; countercurrent flow is preferred for most efficient contact between the feed mixture and the extracting agent. A contact time of at least one-half hour, and preferably at least one hour is desirable.

It is advisable to operate at a relatively low extraction temperature, generally lower than room temperature (about 25° C.) and preferably lower than about 0° C., in order to prevent the occurrence of undesirable reactions, such as isomerization.

It is preferred that the extraction be carried out in the presence of a substantially non-aromatic hydrocarbon, such as hexane, heptane, cyclohexane, an aromatic-free gasoline, an aromatic-free kerosene, liquid petrolatum or the like, the boiling point of which differs from that of the starting mixture. By the addition of the non-aromatic hydrocarbon, the feed mixture is diluted and the selectivity of the separation is thereby improved.

Best results are obtained if the extraction is carried out as a two solvent extraction operation, that is, the feed mixture is extracted with two solvents flowing countercurrently to each other, whereby a first solvent phase enriched in one of the components of the feed mixture and a second solvent phase enriched in another of the components of the feed mixture are obtained. In this case, the aluminum halide-alkyl benzene complex represents one extraction agent, and the substantially non-aromatic hydrocarbon represents the second extraction agent. In this way, a complete rectification of the starting mixture can be achieved. If the phase ratio of the extraction agents is suitably selected and the extraction is carried out in a sufficient number of theoretical stages, it is possible, for example, starting from a mixture of durene and ortho-diethyl benzene, to recover each of the components in a high degree of purity.

Since the complex of the aluminum halide and the alkyl benzene is relatively viscous, it is usually desirable to employ a diluent therefor. The most suitable diluents are the liquid anhydrous hydrogen halides, such as HCl, HBr, and HF. In order to keep the hydrogen halide in the liquid state, a pressure of 20 atmospheres or higher may be applied. The presence of the hydrogen halide considerably facilitates the extraction operation. In all probability, the extraction agent forms a complex with the hydrogen halide, in which complex the hydrogen halide is comparatively loosely bound.

The alkyl benzene extracted from the feed mixture can be separated from the extracting agent by washing either with water or with a substantially non-aromatic hydrocarbon, such as hexane, heptane, cyclohexane, an aromatic-free gasoline, an aromatic-free kerosene, liquid petrolatum or the like, the boiling range of which differs from that of the feed mixture. The washing step can be carried out in one or more stages, either continuously or batchwise. Countercurrent flow is preferred, but concurrent or cross-current flow can also be employed. An excess quantity of the washing liquid should be used in order to wash out the extracted alkyl benzene as completely as possible. Generally, the same non-aromatic hydrocarbon which is employed in the extraction step will be employed in the washing step. The recovered alkyl benzene can be separated from the non-aromatic hydrocarbon by distillation. The extracting agent and the non-aromatic hydrocarbon can be recycled for further use in the process.

The extracting agent can also be regenerated by distillation under reduced pressure.

It is also possible to form the extraction agent in situ at the beginning of the extraction operation by contacting the feed mixture with only the aluminum halide and hydrogen halide. The extracting agent will be formed from the aluminum halide and the alkyl benzene present in the feed mixture which forms the most stable complex therewith. It is to be understood, however, that in the subsequent recovery of extracted alkyl benzene from the extracting agent, not all of the alkyl benzene removed from the feed mixture can be recovered; one mole of alkyl benzene per mole of aluminum halide-alkyl benzene complex is tightly bound in the complex and cannot be separated from the aluminum halide without destroying the aluminum halide. This complex can then be recycled for use as the extracting agent.

The foregoing description of the process will be illustrated by the embodiment represented in the drawing. Thus, the aluminum halide-alkylbenzene extracting agent is readily prepared in a suitable mixer 11, provided with means for maintaining a low temperature therein, as by delivering the alkylbenzene and aluminum halide to the mixer 11 wherein they are mixed while bubbling the corresponding hydrogen halide through the mixture.

The alkylbenzene-aluminum halide-hydrogen halide complex is then contacted with the mixture of alkylbenzenes to be separated, preferably in the presence also of a non-aromatic hydrocarbon. This is suitably done in an extraction column 14 by feeding the mixture of alkylbenzenes to be separated through line 12 to an intermediate point of the extraction column 14, while delivering the two solvents, the complex and the non-aromatic hydrocarbon, to opposite ends of the extraction column 14 through lines 15 and 16, respectively. The extract phase, having the higher specific gravity, is withdrawn from the bottom of the extraction zone through line 17 and the raffinate phase is withdrawn from the top through line 19.

The extract phase is countercurrently washed in extract washer 20 with a washing liquid, which can be for example a further portion of the non-aromatic hydrocarbon used in the extraction column 14. The extracted portion of the alkylbenzene is thus washed out and removed through line 21, and the thus regenerated complex is withdrawn through line 22 and recycled to the extraction column 14. The washing liquid and the extracted alkylbenzene are then separated, as by distillation in fractionator 24, to recover the extracted alkylbenzene through line 25 and the washing liquid through line 26. The washing liquid is suitably condensed, as in condenser 27, and recycled by line 29 for further utility in the process.

The raffinate phase withdrawn through line 19 is separated, as by distillation in fractionator 30, into a fraction containing the alkylbenzene therein and a fraction containing the non-aromatic hydrocarbon solvent therein, which fractions are recovered, as through lines 31 and 32, respectively. The non-aromatic hydrocarbon solvent, as the distillate from this distillation, may be suitably condensed in condenser 27 and recycled by line 29 for further utility in the process.

The present invention is illustrated by the following examples:

*Example I*

A mixture of 15.5 parts by weight of para-xylene and 12 parts by weight of meta-xylene, which mixture was dissolved in 15 parts by weight of n-heptane, was extracted in one stage with 15 parts by weight of a complex of aluminum chloride and meta-xylene (10 parts by weight of aluminum chloride were present), which complex contained a small amount of hydrogen chloride. The extraction temperature was 0° C. Two phases were formed: an upper heptane phase and a lower extract phase; the two phases were then separated.

The upper heptane phase was washed with water to remove traces of aluminum chloride and hydrogen chloride. This phase contained 12 parts by weight of para-xylene and 7 parts by weight of meta-xylene.

The lower extract phase was extracted in one stage with 4 times its weight of n-heptane. Four parts by weight of meta-xylene and 3 parts by weight of para-xylene were obtained from the resulting heptane phase.

A substantially complete separation of the components of the initial mixture can be achieved by extending the extraction to a greater number of stages.

*Example II*

A mixture of 8.1 parts by weight of para-xylene and 12.8 parts by weight of meta-xylene was dissolved in 38.1 parts by weight of n-heptane, and the mixture was extracted in one stage with 30.1 parts by weight of a complex of aluminum chloride and meta-xylene (22.1 parts by weight of aluminum chloride were present). Thirty-seven parts by weight of anhydrous liquid hydrogen chloride were added under a pressure of about 20 atmospheres. The extraction temperature was 0° C. The resulting phases were separated. The major part of the hydrogen chloride present was removed by reducing the pressure. The raffinate phase (the heptane phase) was washed with water to remove any traces of hydrogen chloride and aluminum chloride still present. This phase produced 5.7 parts by weight of para-xylene and 5.4 parts by weight of meta-xylene.

The lower extract phase was extracted 4 times in crosscurrent flow with 4 times its weight of n-heptane. 2.2 parts by weight of para-xylene and 5.9 parts by weight of meta-xylene were obtained from the resulting heptane phase.

*Example III*

A mixture of 13 parts by weight of durene and 10 parts by weight of ortho-diethyl benzene, dissolved in n-heptane, was extracted in one stage with 30 parts by weight of a complex of aluminum chloride, durene and hydrogen chloride. The extraction temperature was 0° C. The resulting raffinate and extract phases were separated.

The raffinate phase (the n-heptane phase) was washed with water to remove any traces of hydrogen chloride and aluminum chloride present. This phase produced 6 parts by ortho-diethyl benzene and 5 parts by weight of durene.

The lower extract phase was extracted with 4 times its weight of n-heptane. 7 parts by weight of durene and 3 parts by weight of ortho-diethyl benzene were obtained from the resulting heptane phase.

*Example IV*

A mixture of 60% meta-xylene and 40% para-xylene was introduced into the fifth stage of an extraction column consisting of 12 stages. 1.5 parts by weight, based on the xylene mixture, of a complex of aluminum chloride and meta-xylene, and 1.5 parts by weight, based on the xylene mixture, of liquid anhydrous hydrogen chloride were introduced into the extraction column at the twelfth stage thereof, and 1.8 parts by weight, based on the xylene mixture, of n-heptane and 0.7 part by weight, based on the xylene mixture, of liquid anhydrous hydrogen chloride were introduced into the extraction column at the first stage thereof. An extract phase containing meta-xylene contaminated by less than 5% of para-xylene was removed from the first stage of the extraction stage. A raffinate phase, containing para-xylene contaminated by less than 5% by meta-xylene, was removed from the twelfth stage.

We claim as our invention:

1. A method for extracting meta-xylene from a mixture of isomeric alkyl benzenes having the empirical formula $C_8H_{10}$ which comprises introducing the mixture to an intermediate stage of a plural stage liquid-liquid contacting zone maintained at a temperature lower than about 25° C., introducing a non-aromatic hydrocarbon and a hydrogen halide into one end of said contacting zone, introducing a hydrogen halide and from about 50% to about 150% by weight, based on said mixture, of an extracting agent comprising a complex of an aluminum halide and meta-xylene into the other end of said contacting zone, separately withdrawing from the contacting zone an extract phase substantially enriched in meta-xylene and a raffinate phase substantially enriched in the remaining components of the feed mixture, and recovering an extract enriched in meta-xylene from the extract phase.

2. A method for separating a mixture of para-xylene and meta-xylene which comprises contacting the mixture at a temperature of lower than about 25° C. and in the presence of a non-aromatic hydrocarbon diluent with, from about 50% to about 150% by weight, based on said mixture, of an extraneously added extracting agent comprising a complex of aluminum chloride, meta-xylene and hydrogen chloride, thereby producing an extract phase substantially enriched in meta-xylene, and recovering an extract enriched in meta-xylene from said extract phase.

3. The method according to claim 2, wherein the extraction temperature is about 0° C.

4. A method for separating a mixture of ortho-diethyl benzene and durene which comprises contacting a mixture, at a temperature of lower than about 25° C. and in the presence of a non-aromatic hydrocarbon diluent, with from about 50% to about 150% by weight, based on said mixture, of an extraneously added extracting agent comprising a complex of aluminum chloride, durene and hydrogen chloride, thereby producing an extract phase substantially enriched in durene, and recovering an extract enriched in durene from said extract phase.

5. The method according to claim 4, wherein the extraction temperature is about 0° C.

6. A method for separating meta-xylene from a mixture of isomeric alkyl benzenes having the empirical formula $C_8H_{10}$ which comprises contacting a mixture, at a temperature of lower than about 25° C. and in the presence of a non-aromatic hydrocarbon diluent, with from about 50% to about 150% by weight, based on said mixture, of an extraneously added extracting agent comprising a complex of an aluminum halide, meta-xylene and a hydrogen halide, thereby producing an extract phase substantially enriched in meta-xylene, and recovering an extract enriched in meta-xylene from said extract phase.

7. A method for separating a meta-dialkyl benzene having from 8 to 10 carbon atoms per molecule from a mixture thereof with its isomers which comprises contacting the mixture at a temperature lower than about 25° C. with from about 50% to about 150% by weight, based on said mixture, of an extraneously added extracting agent comprising a complex of an aluminum halide and said meta-dialkyl benzene, thereby producing an extract phase substantially enriched in said meta-dialkyl benzene, and recovering an extract enriched in said meta-dialkyl benzene from said extract phase.

8. The method according to claim 7, wherein the extraction is effected in the presence of a non-aromatic hydrocarbon diluent.

9. A method for separating a mixture of isomeric alkyl benzenes having from 8 to 10 carbon atoms per molecule which comprises contacting the mixture at a temperature lower than about 25° C. with from about 50% to about 150% by weight, based on said mixture, of an extraneously added extracting agent comprising a complex of an aluminum halide and an alkyl benzene, which complex is at least as stable as the complex formed from the aluminum halide and the alkyl benzene in the initial mixture which forms the most stable complex therewith, thereby producing an extract phase substantially enriched in the alkyl benzene of the initial mixture which forms the most stable complex with the aluminum halide.

10. A method for separating a mixture of alkyl benzenes which have relatively similar boiling temperatures, which comprises contacting the mixture at a temperature lower than about 25° C. with from about 50% to about 150% by weight, based on said mixture, of an extraneously added extracting agent comprising a complex of an aluminum halide and an alkyl benzene, which complex is at least as stable as the complex formed from the aluminum halide and the alkyl benzene in the initial mixture which forms the most stable complex therewith, thereby producing an extract phase substantially enriched in the alkyl benzene of the initial mixture which forms the most stable complex with the aluminum halide.

11. A method for separating a mixture of isomeric alkyl-substituted aromatic hydrocarbons which comprises contacting the mixture at a temperature lower than about 25° C. with from about 50% to about 150% by weight, based on said mixture, of an extraneously added extracting agent comprising a complex of an aluminum halide and an alkyl-substituted aromatic hydrocarbon, which complex is at least as stable as the complex formed from the aluminum halide and the alkyl-substituted aromatic hydrocarbon in the initial mixture which forms the most stable complex therewith, thereby producing an extract phase substantially enriched in the alkyl-substituted aromatic hydrocarbon of the initial mixture which forms the most stable complex with the aluminum halide.

12. A method for separating a mixture of alkyl-substituted aromatic hydrocarbons having relatively similar boiling temperatures, which comprises contacting the mixture at a temperature lower than about 25° C. with from about 50% to about 150% by weight, based on said mixture, of an extraneously added extracting agent comprising a complex of an aluminum halide and an alkyl-substituted aromatic hydrocarbon, which complex is at least as stable as the complex formed from the aluminum halide and the alkyl-substituted aromatic hydrocarbon in the initial mixture which forms the most stable complex therewith, thereby producing an extract phase substantially enriched in the alkyl-substituted aromatic hydrocarbon of the initial mixture which forms the most stable complex with the aluminum halide.

13. The method of treating a mixture consisting of isomers of xylene, including meta xylene, which comprises forming extract and raffinate phases by contacting said mixture at a temperature lower than about 25° C. with an aluminum halide selected from the class consisting of aluminum chloride and aluminum bromide and a hydrogen halide selected from the class consisting of hydrogen chloride and hydrogen bromide, said aluminum halide being present in an amount such that in the presence of a liquid aliphatic hydrocarbon an extract phase substantially enriched in meta xylene and a raffinate phase substantially enriched in the other isomers would be formed and separating said phases.

References Cited in the file of this patent

UNITED STATES PATENTS

| 2,257,086 | Atwell | Sept. 30, 1941 |
| 2,260,279 | D'Ouville et al. | Oct. 21, 1941 |
| 2,458,777 | Hepp | Jan. 11, 1949 |
| 2,481,843 | Holt et al. | Sept. 13, 1949 |
| 2,562,068 | Souders et al. | July 24, 1951 |

OTHER REFERENCES

Fisher et al.: "Berichte," vol. 49 (1916), pages 1475–82.
Thomas: "Anhydrous Aluminum Chloride in Organic Chemistry" (1914), page 719, Reinhold Pub Corp.